INVENTOR
STANISLAS VAN MIERLO
BY Robert Harding Jr.
Attorney

Sept. 7, 1954

S. VAN MIERLO 2,688,661

ELECTRONIC SWITCHING

Filed Jan. 5, 1951

3 Sheets-Sheet 2

Inventor
STANISLAS VAN MIERLO

By Robert Harding Jr.
Attorney

Inventor
STANISLAS VAN MIERLO
By Robert Harding Jr.
Attorney

Patented Sept. 7, 1954

2,688,661

UNITED STATES PATENT OFFICE 2,688,661

ELECTRONIC SWITCHING

Stanislas Van Mierlo, Antwerp, Belgium, assignor to International Standard Electric Corporation, New York, N. Y., a corporation of Delaware Application January 5, 1951, Serial No. 204,654

Claims priority, application France January 6, 1950

7 Claims. (Cl. 179—18)

Figure 1:
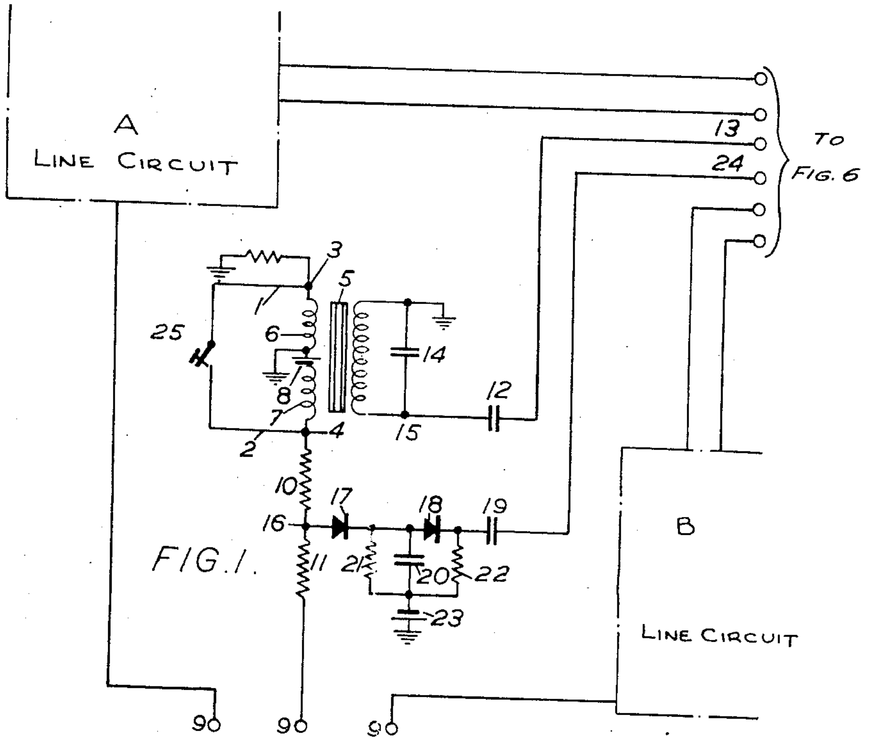

The present invention relates to improvements in electronic switching systems and particularly to commutation systems in which one or several circuits taken from a plurality of circuits are electronically connected respectively to one or several channels of a multiplex junction.

In switching systems used in automatic telephony the line circuits of the subscribers of the same group can be connected, when the corresponding subscriber calls, to one of the junctions common to the subscribers of the group, as long as there remains a free junction, the number of the junctions being generally lower than the number of subscribers of the group. In such systems, the detection of new calls is effected by electronic or electromechanical means, while the necessary switchings are generally made by mechanical or electromechanical means. It has already been suggested to replace the groups of junctions between the different subscribers' groups or between the different parts inside a telephone exchange by multiplex junctions, the scanning of the different subscriber lines or of the different junctions and the allocation of a channel of a multiplex junction to a subscriber or a circuit being made by means of electronic switches, for instance, utilising cathode ray tubes.

One of the objects of the present invention is to provide an electronic switching system of the said type in which the test and the necessary switchings are made by purely electronic means.

According to one feature of the invention, an electronic switching system comprises, in combination, a plurality of circuits associated with means adapted to characterise each one of the said circuits by a code, a multiplex junction, electronic connection means adapted to connect one or several of the said circuits respectively to one or several channels of the said multiplex junction associated with register means adapted to register the code of one or several of the said circuits and to control the establishment of the connection between the said circuits the code of which has been registered and the said multiplex junction by the said electronic connection means.

According to one feature of the present invention, an automatic telephone system comprises, in combination, a plurality of subscriber lines connected to subscriber line circuits, means adapted to characterise each subscriber line circuit and the line circuit associated with it by a code, a multiplex junction having a plurality of channels the number of channels of the said junction being lower than the number of said subscriber line circuits, means adapted to characterise a calling line by a modification of the electric characteristic of one of the points of the line circuit associated with means adapted to successively and periodically apply the code characteristic of each subscriber line to means sensitive to variations of the electric characteristic of a calling line, said means being adapted to modify the electric characteristic of one of the points of their circuit each time that the code characteristic of a calling subscriber line is transmitted to it, a plurality of register means, equal in number to the number of the channels of the said multiplex junction, to which the subscriber code furthermore applied to the means sensitive to variations of the calling line characteristic is transmitted, each one of the said register means being adapted to register the code of a subscriber having caused the variation of the electric characteristic of the means sensitive to variations of the calling line characteristic, the said register means being associated with a directing device adapted to successively and periodically connect each one of the lines the code of which has been registered to the corresponding channel of the said multiplex junction.

According to another feature of the invention, in such systems a subscriber line circuit comprises in combination: a transformer the primary winding of which is divided into two parts interconnected by a battery, two wires of the subscriber lines being connected to the terminals of the primary winding of said transformer one of the terminals of which is thus given a different potential, according as to whether the subscriber line is looped or not, the said potentials respectively characterising a calling line and a free line.

According to another feature of the present invention, means sensitive to variations of potentials of the calling lines comprise in combination: a resistance common to all the line circuits associated with means for bringing the potential of one of the ends of the said resistance to a fixed potential lying between the potential characterising a calling line and the potential characterising a free line, a plurality of rectifying cells, in equal number to the number of group circuits, the said rectifying cells being respectively connected between each one of the terminals of the line circuits the potential of which is characteristic of a calling line and the second end of the resistance common to the whole line circuits, the conductive direction in which the said cells are connected being such that a current can only flow in the said common resistance when one or several lines of the group are calling, a network of rectifying cells the output terminals of which are respectively connected to the terminals of said rectifying cells connected to different circuits of the lines of the group, means adapted to periodically and in a predetermined order apply the different combinations of positive and negative potentials to the input terminals of said network of rectifying cells, the number of the different combinations being at least equal to the number of the subscriber lines of the group, the different combinations of positive and negative potentials and the network of rectifying cells being chosen in such a way that to a given combination of negative and positive potentials a predetermined line corresponds, which when calling allows a current to flow throughout the resistance common to all the subscriber lines of the group, the current coming from the other calling lines then being absorbed by the said network of rectifying cells, the time position of the potential variation on the terminals of the said resistance common to all the lines of the group being characteristic of the calling line.

According to another feature of the invention, in such systems the code characterising each calling line is a binary code.

According to another feature of the invention, each one of the register means comprises, in combination, a proper number of cold cathode tubes associated with means adapted to transmit, under the form of combinations of positive and negative potentials, respectively to each one of the triggering electrodes of said cold cathode tubes, each one of the code elements of the code of the subscriber connected to the device sensitive to potential variations of the different line circuits of the group, associated with means adapted to bring the said triggering electrodes to such a potential that the cold cathode tubes cannot fire whatever may be the potential combination which would furthermore be applied to them, when no potential variations is transmitted by the circuit sensitive to potential variations of the calling lines, the said means being also adapted not to exert action on the potentials the combination of which is characteristic of the subscriber whose line is under scanning each time that the circuit sensitive to potential variations of a calling line modifies the potential on the terminals of the resistance common to all the line circuits, the value of the potentials the combination of which characterises the subscriber code being chosen in a proper way so that the positive potentials cause the firing of the corresponding cold cathode tubes.

According to another feature of the invention, each one of the subscriber lines is connected to the multiplex junction by an "electronic gate" comprising two rectifying cells, oppositely poled, the said "electronic gate" allowing the passage of the modulated current from or to the subscriber line each time that a current flows through the said two oppositely-poled rectifying cells.

According to another feature of the present invention, in such systems the distributing device comprises, in combination, a network of rectifying cells the output terminals of which are respectively connected to the points common to the two rectifying cells of each "electronic gate" of the lines of one group and on the input terminals of which are applied positive and negative potential combinations characterising the code of each subscriber, the said network of rectifying cells being provided in such a way that an output terminal corresponds to each combination of positive and negative potential applied to the input terminals, and a current flows from said output terminal throughout the two rectifying cells of the "electronic gate" which is connected to it, the other output terminals being then brought to such a potential that no current flows in the rectifying cells of the "electronic gates" which are connected to them, so as to place the subscriber line, connected to the "electronic gate," the two rectifying cells of which are traversed by a current, in communication with the multiplex junction.

According to another feature of the invention, such systems comprise means adapted to successively and periodically transmit, under the form of positive and negative potential combinations, the subscriber codes which habe been registered by potential variations of the anodes of cold cathode tubes, to the input terminals of a network of rectifying cells the output terminals of which are connected to the electronic gates, so as to successively and periodically place each subscriber, the code of which has been registered, in communication with the multiplex junction.

According to another feature of the invention, such systems comprise means adapted to transmit potential variations of each output terminal of said network of rectifying cells connected to the different electronic gates at the point of the corresponding line circuit the potential variations of which are characteristic of a calling line, so as to modify the potential of said point of the line circuit as soon as the said line is connected to said multiplex junction, and to suppress the subsequent sending of impulses towards the register means and through the circuit sensitive to potential variations of the calling line and thus to avoid the registration of the subscriber code in another register means.

Figures 2, 3:
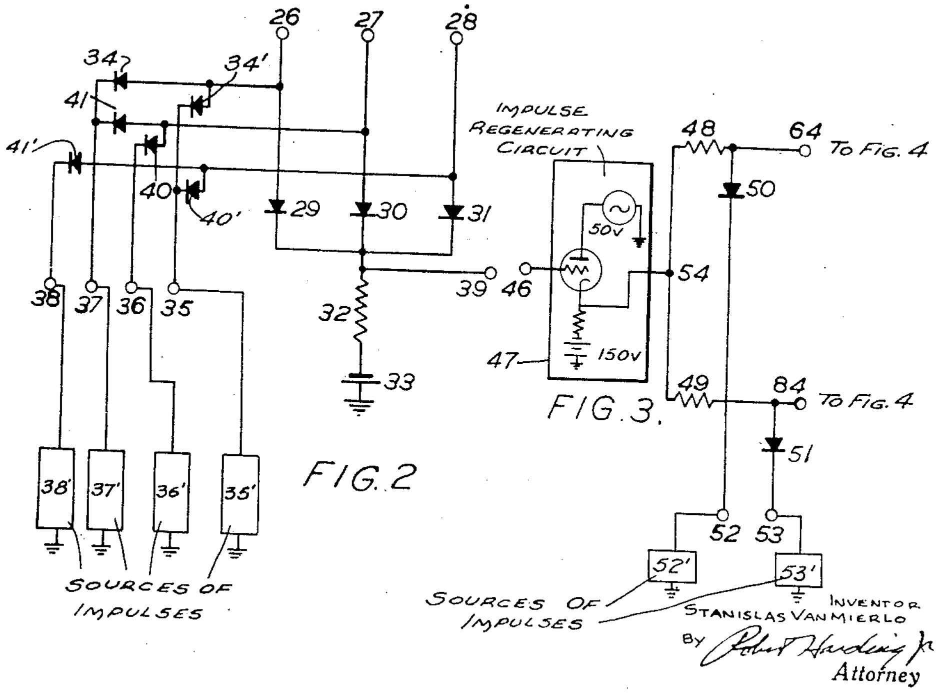
Figures 4, 5:
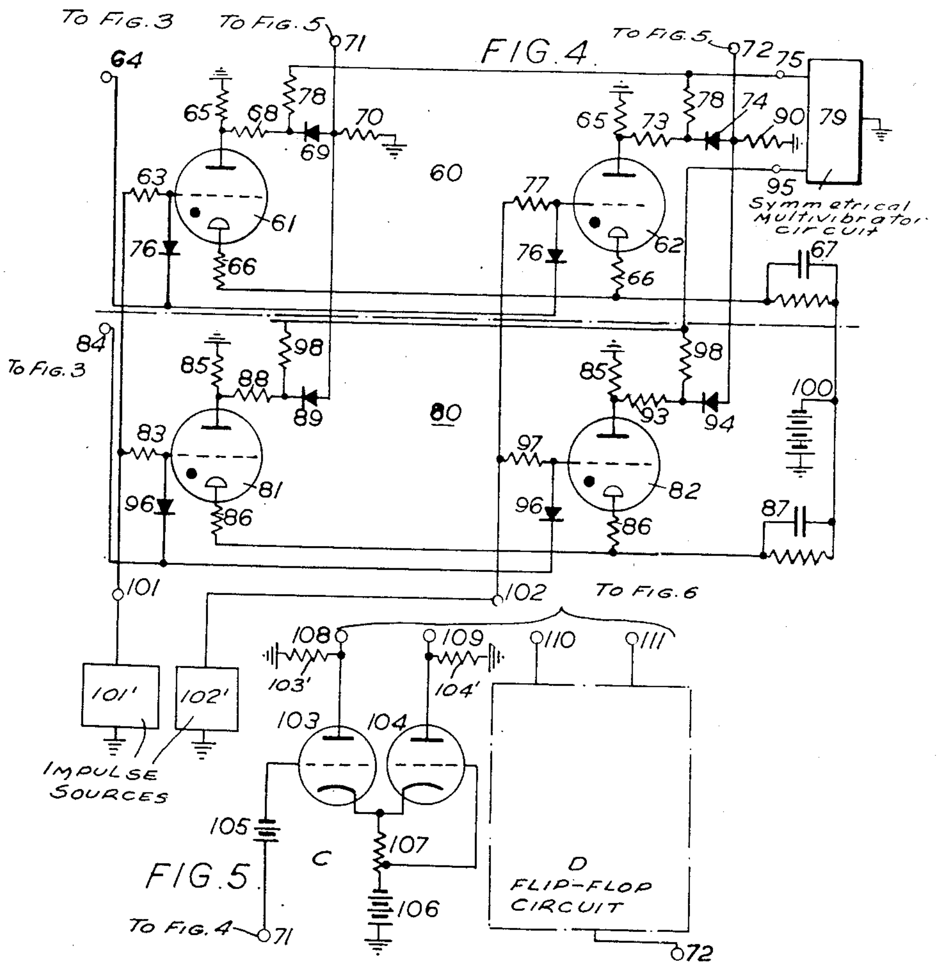
Figure 6:
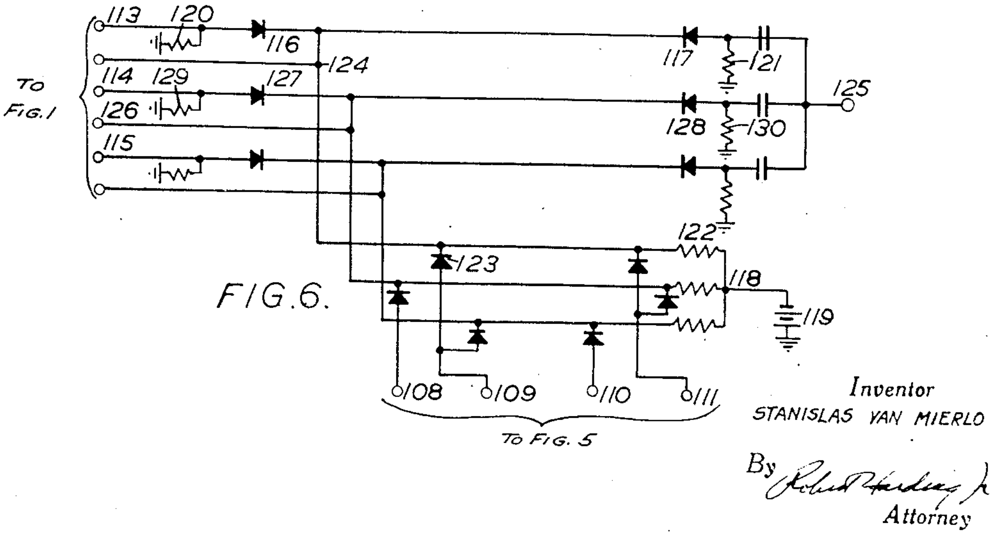
Figure 7:
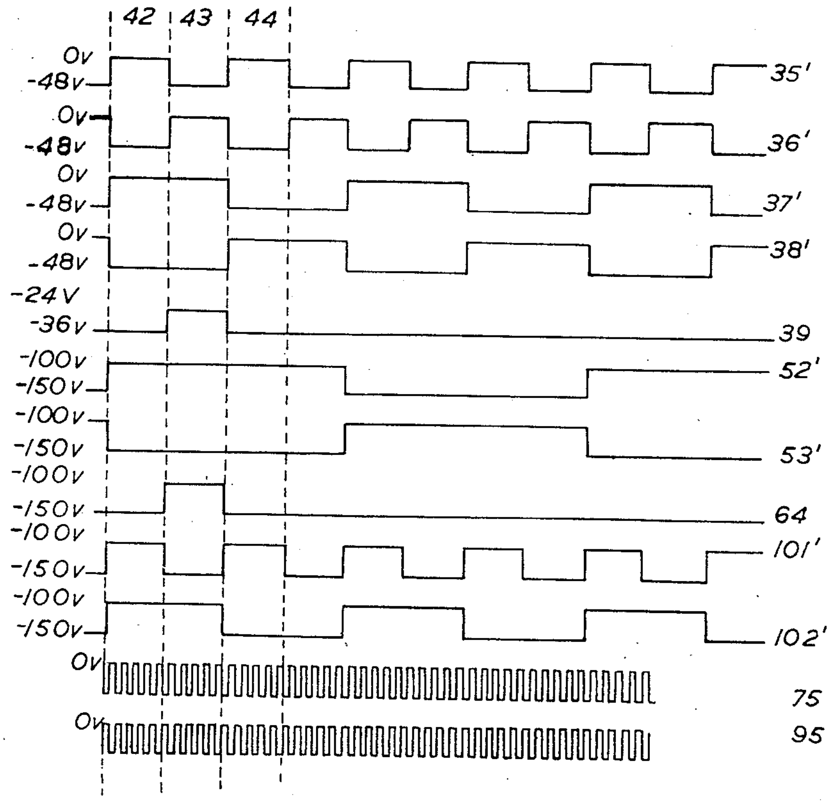

Other objects, features and advantages of the present invention will clearly appear from the following description of an embodiment utilising features of the present invention, the said description being made in relation with the annexed drawings in which:

Fig. 1 represents a plurality of subscriber line circuits, one of which is shown in detail, Fig. 2 represents a scanning circuit, Fig. 3 represents a distributing circuit, Fig. 4 represents a register circuit, Fig. 5 represents two impulse transformer circuits, one of which is shown in detail, Fig. 6 represents an electronic distributor, Fig. 7 represents diagrams of impulses.

In the detailed subscriber line circuit of Fig. 1, the line wires 1 and 2 are connected to terminals 3 and 4 of the primary winding of transformer 5. The primary winding of transformer 5 is divided into two parts 6 and 7 interconnected by a 48 volt battery 8. The positive terminal of battery 8 and terminal 3 of the winding of transformer 5 are connected to ground. Terminal 4 of the primary winding of transformer 5 is connected to terminal 9 of the line circuit by means of resistances 10 and 11. One of the terminals of the secondary winding of transformer 5 is connected to ground, the other terminal 15 being connected by means of condenser 12 to terminal 13 of the line circuit. A condenser 14 is parallelly connected to the secondary winding of transformer 5. Point 16 common to resistances 10 and 11 is connected by means of a circuit comprising rectifying cells 17 and 18 and condenser 19 to terminal 24 of the line circuit. The rectifiers 17 and 18 and condenser 19 are connected in series, the rectifiers being adjacent the point 16 and poled so as to pass current away from point 16. A battery 23 has its positive terminal connected to ground and its negative terminal connected through a resistance 21 to the junction of rectifiers 17 and 18. The resistance 21 is shunted by a condenser 20. A resistance 22 is connected between the negative terminal of the battery 23 and the junction between rectifier 18 and condenser 19. The subscriber station has been schematically represented by a switch 25 which is opened when the subscriber hangs up his receiver. The rectangles A and B represent other subscriber line circuits identical with that just described.

Fig. 2 represents a circuit adapted to detect the calls and to transmit, for each new detected call, a new series of impulses the time position of which with respect to reference impulses is characteristic of the new calling line. This circuit will be designated in the following description as "scanning circuit." The output terminals 9 (Fig. 1) of the three subscriber lines are respectively connected to terminals 26, 27 and 28, each terminal being connected through a rectifying cell, such as 29, 30 and 31, to one of the ends of resistance 32, the other end of which is connected to the negative terminal of a 36 volt battery 33. The junction of resistance 32 and the rectifiers 29, 30, and 31 is connected to an output terminal 39 which thus forms a common point for these rectifiers and resistance. A network of rectifying cells is connected between terminals 26, 27 and 28 and terminals 35, 36, 37 and 38. Thus, the terminal 26 is connected to the terminal 37 through the rectifier 34 and to the terminal 35 through the rectifier 34'; terminal 27 is connected to the terminal 37 through the rectifier 41 and to the terminal 36 through the rectifier 40; the terminal 28 is connected to the terminal 35 through the rectifier 40' and to the terminal 38 through the rectifier 41'. To terminals 35, 36, 37 and 38 are connected, respectively, pulse sources 35', 36', 37', and 38' which produce recurrent impulses the form and amplitude of which have been indicated in Fig. 7. In this figure the source which produces the impulse is identified on the right hand side with respect of each series of impulses.

In the following description, each subscriber will be designated by the reference of the terminal of scanning circuit to which terminal 9 of its line circuit is connected. When a subscriber calls, the switch 25 of its station closes the circuit of battery 8. The potential of point 9 tends to rise from —48 volts to —24 volts. If subscriber 27 calls, it will be seen that a current would then tend to be established between point 9 of its line circuit and ground, through resistance 32 which would tend to cause output or common point 39 to rise to —24 volts. On the other hand, terminal 27 is connected to rectifiers 40 and 41, themselves respectively connected to terminals 36 and 37. If at least one of the terminals 36 and 37 is at a negative potential with respect to the potential of point 9 of the calling line (—24 volts) no current will flow through rectifier 30, the current coming from point 9 of the line circuit of the calling line being absorbed towards terminals 36 and 37. The current consequently can only flow from line 27 to point 39 during time 43 (Fig. 7), during which terminals 36 and 37 are brought to potential 0. Then there will be obtained on point 39, due to the voltage drop in resistance 32, a positive impulse the form of which has been represented in Fig. 7 on line 39. It will also be seen that in the case in which lines 26 and 28 are calling, an impulse is obtained respectively in times 42 and 44, these impulses being regularly repeated. Each one of the three subscribers is thus characterised by a two element binary code. If there is conventionally designated by "1" the combination of potentials 0 volt and —48 volts respectively applied on terminals 35 and 36 or on terminals 37 and 38, and by "0" the inverse combination, it will be seen that subscribers 26, 27 and 28 are characterised by codes "11," "01," "10."

In the considered embodiment, the lines are scanned 500 times per second, each line being scanned during 500 microseconds.

Fig. 3 represents an electronic distributor. The impulses produced at 39 (Fig. 2) are transmitted to an impulse regenerating circuit 47 which gives in its output an impulse of predetermined amplitude; in the case considered, the impulses transmitted to terminal 46 are transformed into 50 volt positive impulses from —150 volts. Such an impulse regenerating device may, for instance, comprise a cold cathode tube to the control grid on which is transmitted the impulse to be regenerated; the regenerated impulse is then collected in the cathode circuit. The impulse obtained in the output of circuit 47 is transmitted by means of resistances 48 and 49, on the one hand to rectifying cells 50 and 51 and on the other hand to terminals 64 and 84 of the calling subscriber code register circuit which will be described in relation to Fig. 4. The other terminals of the rectifying cells 50 and 51 are on the other hand connected to terminals 52 and 53. 50 volt positive impulses from —150 volts are transmitted 250 times per second to terminal 52 from source 52', each impulse having a 2000 microsecond duration, i. e. the duration of the scanning for the total of the lines. 2,000 microseconds identical displaced impulses are also transmitted to terminal 53 from source 53'. These impulses are respectively represented on lines 52' and 53' of Fig. 7. If there is assumed that an impulse characteristic of a calling line is transmitted to terminal 46, it is transformed by the regenerating circuit 47 into a 50 volt impulse from —150 volts, and during all this impulse (500 microseconds) point 54 is brought to —100 volts. If during the calling lines scanning cycle, during which this impulse takes place, terminal 52 is at a potential —100 volts, terminal 53 being then at potential —150 volts, a current will flow between point 54 and terminal 53 through resistance 49 and the rectifying cell 51; terminal 84 is then brought to a potential near —150 volts. Point 54 and terminal 52 being brought to the same potential, —100 volts, terminal 64 is brought during the impulse to potential —100 volts. If the impulse characterising a calling line takes place during the following cycle, during which terminal 52 is at —150 volt potential and terminal 53 at —100 volt potential, terminal 64 would be maintained at a potential near —150 volts and terminal 84 at a —100 volt potential. When no impulse characterising a calling line is transmitted to terminal 46, point 54 is at —150 volt potential and due to the sense in which rectifying cells 50 and 51 are connected, terminals 64 and 84 are held at —150 volt potential whatever may be the potential of terminals 52 and 53.

Fig. 4 represents a calling subscriber code register circuit. It comprises two circuits 60 and 80 each one comprising two cold cathode tubes, i. e. a cold cathode tube per one code element. The two circuits are identical and only circuit 60 will be described in detail. In both cases, elements playing an identical part are shown by means of reference number having the same unit figure. The anode of each of the cold cathode tubes 61 and 62 is connected to the ground through a resistance such as 65, and each cathode is connected to negative terminal 100 of a 200 volt battery through a resistance, such as 66, and the common element 67 which comprises a resistance in parallel with a condenser. The anodes of cold cathode tubes 61 and 81 are furthermore respectively connected through resistances 68 and 88 and rectifying cells 69 and 89, to terminal 71. The anodes of cold cathode tubes 62 and 82 are identically connected by means of resistances 73 and 93 and rectifying cells 74 and 94 to terminal 72. The terminals 71 and 72 are connected to ground, respectively, through resistances 70 and 90. The points common to elements 68 and 69, on the one hand, and to elements 73 and 74, on the other hand, are connected to terminal 75 by means of resistances, such as 78, while the points common to elements 88 and 89, on the one hand, and to elements 93 and 94, on the other hand, are connected to terminal 95 through resistances, such as 98. Terminal 64 (Fig. 3) is connected to each one of the triggering electrodes of cold cathode tubes 61 and 62 by means of rectifying cells, such as 76, while terminal 84 (Fig. 3) is connected by means of rectifying cells, such as 96, to each one of the triggering electrodes of cold cathode tubes 81 and 82. The triggering electrodes of tubes 61 and 81 are respectively connected by means of resistances 63 and 83 to terminal 101, while the triggering electrodes of cold cathode tubes 62 and 82 are respectively connected by means of resistances 77 and 97 to terminal 102.

Terminals 75 and 95 are connected to the output terminals of a symmetrical multivibrator circuit which has been represented by schematic device 79. Such devices are well known in the art and it is possible to connect terminals 75 and 95 in the anode circuit of each one of the two triodes constituting the multivibrator so as to obtain on one of the two terminals a negative potential, for instance, the other terminal then being at the earth potential of the device on which the positive terminal of the high tension voltage is connected. The frequency of the multivibrator circuit 79 is adjusted at 10,000 cycles per second and the form of the impulses transmitted to terminals 75 and 95 has been represented in Fig. 7. Impulses shaped as those transmitted to terminals 35 and 37 (Fig. 2) are respectively transmitted to terminals 101 and 102 of the register circuit (Fig. 4) from impulse sources 101′ and 102′, the pulses being indicated on lines 101′ and 102′ of Fig. 7. The amplitude of these impulses lies between 100 volts and −150 volts.

Normally, all the cold cathode tubes of the different circuits are cut out, the potential applied on the cathode (−200 volts with respect to the anode) being insufficient to cause firing. In order for one of the cold cathode tubes to ionize, it is necessary that its triggering electrode be brought to −100 volts. If we, for instance, consider the case of cold cathode tube 61, it will be seen that its triggering electrode can only be brought to −100 volts, when terminal 64 of the distributing device, represented on Fig. 3, and terminal 101 are simultaneously brought to −100 volt potential. If we assume, that line 27 (Fig. 2) is calling, an impulse of 500 microseconds is transmitted from point 39 (Fig. 2) by the distributing circuit (Fig. 3) to one of the terminals 64 and 84, according to the potential combination applied on terminals 52 and 53. It is assumed that no limitation results from this fact, that when the impulse is transmitted to the distributing circuit, terminal 52 is at −100 volt potential and terminal 53 at −150 volt potential, as it is represented on Fig. 7. The impulse varying from −150 volts to 50 volts is then transmitted to terminal 64 as an impulse of −100 volts, and its time position, with respect to impulses transmitted to terminals 35, 36, 37 and 38 of the scanning circuit (Fig. 2), is characteristic of the calling line. In the particular considered case, terminal 101 is at −150 volt potential and terminal 102 is at −100 volt potential, while terminal 64 is at −100 volt potential. In this case cold cathode tube 62, the triggering electrode of which is brought to −100 volts, fires, while cold cathode tube 61, the triggering electrode of which is brought to the potential of terminal 101 (−150 volts) does not fire. The anode potential of tube 61 thus remains at potential 0, the anode potential of tube 62 becomes negative due to the voltage drop in resistance 65. Tubes 81 and 82 of the second circuit remain unfired due to the fact that terminal 84 is held at −150 volts. As a matter of fact, terminal 101 being at −150 volt potential, no current is established in resistance 83 and the rectifying cell 96 connected to the triggering electrode of tube 81 which is also held at −150 volt potential, while a current is established between terminal 102 and terminal 84 through resistance 97 and rectifying cell 96 connected to the triggering electrode of cold cathode tube 82 which is thus brought to −150 volt potential. The resistances in the elements 67 and 87 connected in the cathode circuit are provided so as to cause a potential drop when one or more of the tubes of the circuit are fired, such that the cathode potential is no longer sufficiently low to permit the firing of cut-out tubes, even when the potential of the triggering electrode of these tubes is brought to −100 volt potential. On the other hand, the condensers of elements 67 and 87 delay the rise in potential of the cathode circuit when two tubes are supposed to fire simultaneously and one tube fires a little ahead of the other, so that the other tube is not prevented from firing. Furthermore, as will be described in connection with the electronic switch represented on Fig. 6, means is provided adapted to suppress the sending of the impulse the time position of which is characteristic of the calling line as soon as the code of this line has been registered, so as to prevent the registering of the calling line code in the following circuit, if free, when the distributing device, represented in Fig. 3, will transmit impulses produced at 39 (Fig. 2) to terminal 84 (Figs. 3 and 4) during the second cycle of subscriber line scanning.

Fig. 5 represents two flip-flop circuits each utilising two triodes 103 and 104. Only one circuit C is shown in detail, the other being represented by the rectangle D. The grid of triode 103 of flip-flop circuit C is connected through a battery 105 to terminal 71, (Fig. 4) the potential difference between the terminals of the battery and the direction in which it is connected being such that triode 103 is conductive when terminal 71 is at 0 potential and that the triode is blocked when terminal 71 is at a negative potential which it is when cold cathode tube 61 is conducting. The cathodes of triodes 103 and 104 are connected to the negative terminal of a 200 volt battery through resistance 107, the anodes being connected to earth respectively through resistances 103′ and 104′. When terminal 71 is at a positive potential (0 volt), triode 103 is conductive and the anode of triode 103 is at a negative potential with respect to ground. In the embodiment under consideration, the value of resistance 103′ is chosen in such a way that the anode potential is −48 volts when the triode is conductive. A current then flows in resistance 107, the cathode potential increases and blocks triode 104, the grid of which is connected to a suitable point of the common cathode resistance. The anode of triode 104 is then brought to ground potential.

Terminals 71 and 72 are connected to terminals 71 and 72 of two circuits C and D which are identical. If we assume, as it has been shown the case above, that the code of subscriber 27 (Fig. 2) is recorded in circuit 60, the anode of tube 61 is at the earth potential and the anode of tube 62 is at a negative potential with respect to earth, for instance −10 volts.

As long as terminal 75 is at the earth potential (0 volt), the anode potential of tube 61 has no influence on the potential of terminal 71 due to the direction in which rectifier 69 is connected. Also in this case the anode potential of tube 62 has no influence on the potential of terminal 72. When terminal 75 is brought to a negative potential, a current can be established between the anodes brought to a negative potential and the earth through resistances 70 or 90. For instance, in the case under consideration the anode of tube 62 is brought to a negative potential with respect to the earth and a current can be established through resistance 73, rectifying cell 74 and resistance 90 bringing the grid potential of triode 103 in the flip-flop circuit D to a negative potential with respect to the cathode. Triode 103 of this circuit D is then blocked and its anode is brought to earth potential while the anode of tube 104 receives a −48 volt potential, according to the above mentioned operations. If we designate by 108 and 109 the output terminals connected to the anodes of tubes 103 and 104 of the flip-flop circuit C connected to terminal 71 and by 110 and 111 the output terminals of the flip-flop circuit D the input terminal of which is connected to terminal 72, it will be seen that we will obtain, in the case in which the code of subscriber 27 is recorded in circuit 60, −48 volt, 0 volt, 0 volt, −48 volt potentials respectively on terminals 108, 109, 110 and 111, each time terminal 75 is brought to a negative potential with respect to the earth. We also assume that circuit 80 is free and that consequently the anodes of the cold cathode tubes of this case are at 0 volt potential. When the potential of terminal 75 is at 0 potential and therefore the potentials of the anodes of the different cold cathode tubes of circuit 60 have no longer an influence on the potentials of terminals 71 and 72, terminal 95 is brought to a negative potential with respect to earth and no current flows in the anode of the said tubes towards the earth through resistances 70 and 90, connected to terminals 71 and 72. It is easy to see that in this case terminals 108, 109, 110 and 111 are respectively brought to −48 volt, 0 volt, −48 volt, 0 volt potentials. Terminals 75 and 95 are alternatively negative and positive at 10,000 times per second and the subscriber code registered in circuit 60 will be reproduced 10,000 times per second on terminals 108, 109, 110 and 111, each time during 50 microseconds, while the code corresponding with no subscriber, as circuit 80 is free, is transmitted 10,000 times per second between the period during which the code registered in circuit 60 is transmitted.

In the particular embodiment considered it has not been envisaged to limit the system to one comprising three lines and utilising a two circuit register; it is easy to see that in a system comprising 100 subscriber lines it is possible to utilise a register having 16 circuits, for instance, each circuit comprising seven cold cathode tubes to register a seven element code; in this case, the symmetrical multivibrator utilised to successively distribute the code of each subscriber to terminals 108, 109, 110 and 111, would be replaced, for instance, by a distributing circuit utilising rectifying cell networks, said circuit being adapted to connect each one of the 16 circuits successively, 10,000 times per second and each time during 6 microseconds, to a set of 7 terminals playing a part identical to the one played by terminals 71 and 72 (Fig. 5).

Fig. 6 represents the circuit enabling the subscriber whose code is registered under the form of a potential combination on terminals 108, 109, 110 and 111, to be connected to the channel of the multiplex junction. The channel of the multiplex junction is indicated at 125 and the terminals at the left of Fig. 6 are connected respectively to those at the upper right of Fig. 1, so that each line circuit has two leads connected to the channel. In order that the current, outgoing from the line A (Fig. 1), connected for instance to terminal 113 (subscriber 26), will pass through the electronic gate composed of rectifying cells 116 and 117, it is necessary that a current is made to flow between the earth and point 118, held at −48 volt potential by battery 119, through resistances 120 and 121, rectifying cells 116 and 117, and resistance 122. This can only take place when neither of terminals 109 and 111 are positive. This will happen when terminals 108 and 110 have 0 volt potential applied to them and terminals 108 and 111 have a negative potential (−48 volts) applied to them. If one of terminals 109, 111, or both at the same time, were brought to a positive potential, a current would be established between the terminal brought to the positive potential (109 for instance) and point 118 through resistance 122 and rectifying cell 123, thus bringing the potential of point 124 to near 0 and suppressing the current through cells 116 and 117. In the embodiment considered in connection with the previous figures, the code of the subscriber the line circuit circuit of which is connected to terminal 27 (Fig. 2) is transmitted, under the form of a potential combination (−48 volts, 0 volt, 0 volt, −48 volts respectively) to terminals 108, 109, 110 and 111, 10,000 times per second, and each time during 50 microseconds. Each time that this code is transmitted the subscriber line connected to terminal 114 from terminal 13 of Fig. 1 is connected with the input terminal 125 of the multiplex junction. Between the periods during which the line connected to terminal 114 is connected with the multiplex junction, the potential combination −48 volts, 0 volt, —48 volts, 0 volt is transmitted to terminals 108, 109, 110 and 111, if we assume that circuit 80 is free. It is easy to see that, in this instance, no line is connected with the multiplex junction. In the case in which the code of another subscriber has been registered in circuit 80 (Fig. 4), this code would be transmitted under the form of a potential combination to terminals 108, 109, 110 and 111, instead of the code characterising the non-busy condition of circuit 80, and this subscriber would be connected with the multiplex junction between periods during which line 27 is connected.

The terminal corresponding to 24 of each line circuit is connected to the common point of the two rectifying cells constituting the "electronic gate" between the terminal corresponding to 13 and the multiplex junction 125 of this line. For instance, point 24 of line 27 is connected to point 126. As soon as point 16 of the line circuit is brought to —24 volts, the code of the line is then registered, as has been above explained, on the cold cathode tubes of one of the circuits of the calling subscriber code register. This code is then applied 10,000 times per second to terminals 108, 109, 110 and 111. Each time that the code is applied, a current flows between point 118 and the earth through rectifying cells 127 and 128 and resistances 129 and 130. Point 126 is thus brought to a negative potential with respect to —24 volts, and condenser 20 (Fig. 1) is charged during all the impulse. Between every two of the periods during which the line is connected to the multiplex junction 125, condenser 20 is discharged through resistance 21 keeping the end of resistance 21, connected to rectifying cell 17, at a negative potential with respect to the potential of point 16 (—24 volts). Point 16 is thus brought to a potential near —36 volts. This potential fall prevents current flowing from point 9 of the calling line towards battery 33 (Fig. 2) when the line is scanned a second time by the scanning circuit (Fig. 2), thus preventing another registration of the calling subscriber code in the second circuit of the register circuit (Fig. 4) during the second period of line scanning.

A system has been described comprising only three subscriber lines and in which the scanning circuit (Fig. 2), the distributing circuit (Fig. 3), and the connection circuit (Fig. 6) utilise rectifying cell networks. It is clear for those skilled in the art that electronic circuits, for instance utilising cathode ray tubes, such as those described in French Patent No. 930,641, corresponding to United States Patent No. 2,584,987, issued in February 12, 1952, to E. M. Deloraine, may be utilised either in the scanning circuit, or in the circuits in which it is necessary to transmit an impulse to a predetermined circuit selected among a plurality of circuits. In the same way a certain number of circuits, such as the flip-flop circuit represented in Fig. 5, the symmetrical multivibrator circuit having the reference 79 (Fig. 4), and the impulse regenerating circuit 47 (Fig. 3), could be realised in different ways well known in the art.

More generally the circuits or elements utilised in the system described can be replaced by circuits or organs playing an identical function without departing from the scope of the present invention.

I claim:

1. An electronic switching system comprising a plurality of line circuits, a resistor, separate means for connecting each of said line circuits to a common point on one end of said resistor, said means each including a uni-directional current-carrying device, said devices all being poled in the same direction, a plurality of conductors, means including uni-directional current-carrying devices for connecting each of said line circuits to a predetermined different combination of said conductors, said last-mentioned devices being poled in the same direction with respect to said lines as said first-mentioned devices, sources of voltage pulse trains having different pulse characteristics, there being one for each of said conductors, means for connecting said sources between the other end of said resistor and said conductors, means in each of said line circuits for normally maintaining a potential difference between said circuit and the other end of said resistor, such as to prevent current flow through said resistor, means in each of said line circuits responsive to a change of condition of said line circuit for altering said potential difference so as to permit current flow through said resistor when simultaneous pulses on the conductors connected thereto block current flow between said conductors and said line circuit, whereby the potential on said common point will be altered for the duration of said simultaneous pulses, thus producing a voltage pulse whose time position will be characteristic of the line circuit the condition of which has been changed, an output channel, a first gating network connected between all of said line circuits and said channel and normally blocking current flow between said circuits and said channel, registering means connected to said common point for registering the time position of a pulse appearing on said common point and having an output connected to said gating network, and means controlled by said registering means for causing said gating network to permit current flow between said channel and the line circuit the time position of which has been registered in said registering means.

2. An electronic switching system, as defined in claim 1, in which the sources of pulse trains connected to the conductors are arranged to produce simultaneous pulses on the combination of conductors connected to a given line at a time position in a repetitive cycle which is different from the time position in said cycle at which simultaneous pulses appear on the combination of said conductors connected to any other of said lines.

3. An electronic switching system, as defined in claim 1, in which the registering means comprises a plurality of gas discharge tubes and means for biasing different combinations of said tubes for each time position, whereby an input pulse from the common point at a particular time position will fire a particular combination of said tubes, the output circuits of said tubes being connected to said gating network.

4. An electronic switching system, as defined in claim 3, in which the gating network comprises a connection from each line to the channel, said connection including two oppositely-poled, unidirectional, current-carrying devices, means for normally biasing the junction point of said devices so as to prevent a signal from passing through said devices to said channel and means connected to the registering means and controlled by the setting thereof for removing the bias at predetermined repetitive times for permitting a signal to pass to said channel.

5. An electronic switching system, as defined in claim 1, in which there are a plurality of registering means, and further comprising a distributor connected between the common point and said registering means, means for causing said distributor to connect said common point to said registering means in succession, and switching means for effectively connecting said registering means successively to the gating network.

6. An electronic switching system, as defined in claim 5, in which the switching means comprises a second gating network connected to the outputs of the plurality of registering means, and means for blocking the outputs successively in a repetitive cycle.

7. An electronic switching system, as defined in claim 6, further comprising a condenser network in each line circuit, connected to the first gating circuit, means for lowering the potential of the line circuit so as to prevent current flow through the resistor when said condenser network is charged, said condenser network being connected to said first gating network, and means in said gating network for charging said condenser network during a time immediately following the time during which current is permitted to flow between the channel and said line circuit.

References Cited in the file of this patent

UNITED STATES PATENTS

| Number | Name | Date |
|---|---|---|
| 2,133,415 | Baker et al. | Oct. 18, 1938 |
| 2,152,889 | Jedrychowski | Apr. 4, 1939 |
| 2,563,589 | Den Hertog | Aug. 7, 1951 |
| 2,580,093 | Hersey | Dec. 25, 1951 |
| 2,583,711 | Scowen | Jan. 29, 1952 |